(12) United States Patent
Hou et al.

(10) Patent No.: US 11,857,952 B2
(45) Date of Patent: Jan. 2, 2024

(54) GRAPHITIC CARBON-DOPED AND MIXED CRYSTAL-TYPE TITANIUM DIOXIDE NANOTUBE COMPOSITE FOR ELECTROCATALYSIS, AND PREPARATION METHOD AND USE THEREOF

(71) Applicant: Xinjiang Youmiao Environmental Protection Technology Co., Ltd., Karamay (CN)

(72) Inventors: Junwei Hou, Karamay (CN); Jihong Ren, Karamay (CN); Liqiang Ma, Karamay (CN)

(73) Assignee: Xinjiang Youmiao Environmental Protection Technology Co., Ltd., Karamay (CN)

( * ) Notice: Subject to any disclaimer, the term of this patent is extended or adjusted under 35 U.S.C. 154(b) by 71 days.

(21) Appl. No.: 17/747,217

(22) Filed: May 18, 2022

(65) Prior Publication Data
US 2023/0372904 A1 Nov. 23, 2023

(51) Int. Cl.
| | | |
|---|---|---|
| *B01J 23/42* | (2006.01) | |
| *B01J 21/18* | (2006.01) | |
| *B01J 35/00* | (2006.01) | |
| *B01J 37/02* | (2006.01) | |
| *B01J 21/06* | (2006.01) | |

(52) U.S. Cl.
CPC ............ *B01J 23/42* (2013.01); *B01J 21/063* (2013.01); *B01J 21/18* (2013.01); *B01J 35/0033* (2013.01); *B01J 37/0201* (2013.01)

(58) Field of Classification Search
CPC . B01J 23/42; B01J 21/063; B01J 21/18; B01J 35/0033; B01J 37/0201
USPC .................... 502/182, 350; 977/811
See application file for complete search history.

(56) References Cited

U.S. PATENT DOCUMENTS

| | | | | |
|---|---|---|---|---|
| 6,855,025 B2* | 2/2005 | Iwasaki | ................... | H01J 9/025 |
| | | | | 445/24 |
| 7,524,791 B2* | 4/2009 | Furuya | ...................... | C23C 8/28 |
| | | | | 148/277 |

FOREIGN PATENT DOCUMENTS

| | | | | |
|---|---|---|---|---|
| CN | 102107850 A | * | 6/2011 | ............... B81C 1/00 |
| CN | 101773821 B | * | 3/2012 | ............... A62D 3/10 |
| CN | 103769072 A | * | 5/2014 | ............. Y02E 60/36 |

(Continued)

*Primary Examiner* — Patricia L. Hailey
(74) *Attorney, Agent, or Firm* — Spencer Fane, LLP (57) ABSTRACT

The present disclosure belongs to the technical field of electrocatalytic materials, and provides a graphitic carbon-doped and mixed crystal-type titanium dioxide nanotube composite for electrocatalysis, and a preparation method and use thereof. The composite for electrocatalysis includes a titanium substrate and a titanium dioxide nanomesh deposited on the titanium substrate, where the titanium dioxide nanomesh is woven from titanium dioxide nanowires; the titanium dioxide nanowires include anatase-type titanium dioxide nanowires and rutile-type titanium dioxide nanowires. The mixed crystal-type titanium dioxide phase improves a catalytic activity of the composite for electrocatalysis; meanwhile, the titanium dioxide nanowires are further loaded with graphitic carbon particles to improve an overall conductivity of the composite for electrocatalysis. Therefore, the composite for electrocatalysis has a high electron mobility to achieve an improved electrocatalytic activity, which can be applied to the degradation of organic pollutants by electrocatalysis.

12 Claims, 8 Drawing Sheets

(56) References Cited

FOREIGN PATENT DOCUMENTS

| | | | | |
|---|---|---|---|---|
| CN | 104616910 A | * | 5/2015 | ............. H01G 11/30 |
| CN | 107978734 A | * | 5/2018 | ............. C25D 11/26 |
| CN | 111392771 A | * | 7/2020 | ............. B01J 13/02 |

* cited by examiner

GRAPHITIC CARBON-DOPED AND MIXED CRYSTAL-TYPE TITANIUM DIOXIDE NANOTUBE COMPOSITE FOR ELECTROCATALYSIS, AND PREPARATION METHOD AND USE THEREOF

TECHNICAL FIELD

The present disclosure relates to the technical field of electrocatalytic materials, in particular to a graphitic carbon-doped and mixed crystal-type titanium dioxide nanotube composite for electrocatalysis, and a preparation method and use thereof.

BACKGROUND ART

With biochemical inertness, no toxicity, low cost, and anti-corrosion properties, titanium dioxide is regarded as a suitable electrocatalytic material for environmental pollution treatment, and has been widely used in the degradation of harmful substances and water pollutants. However, modification of the titanium dioxide is still essential to improve electrical properties as a poor electrical conductivity of the titanium dioxide limits use thereof in electrocatalysis.

At present, surface modification methods of titanium dioxide nanotubes include semiconductor composite modification, such as a carbon/titanium dioxide composite. A method for preparing a carbon/titanium dioxide composite is mainly to impregnate the titanium dioxide with a glucose solution, and the titanium dioxide in the prepared carbon/titanium dioxide composite is amorphous titanium dioxide. The amorphous titanium dioxide is easily broken off in water, such that a catalytic performance of the carbon/titanium dioxide composite needs to be further improved.

SUMMARY

In view of this, an objective of the present disclosure is to provide a graphitic carbon-doped and mixed crystal-type titanium dioxide nanotube composite for electrocatalysis, and a preparation method and use thereof. The graphitic carbon-doped and mixed crystal-type titanium dioxide nanotube composite for electrocatalysis has an excellent catalytic performance.

To achieve the above objective, the present disclosure provides the following technical solutions.

The present disclosure provides a graphitic carbon-doped and mixed crystal-type titanium dioxide nanotube composite for electrocatalysis, including a titanium substrate and a titanium dioxide nanomesh deposited on the titanium substrate, where the titanium dioxide nanomesh is woven from titanium dioxide nanowires; the titanium dioxide nanowires include anatase-type titanium dioxide nanowires and rutile-type titanium dioxide nanowires, and are loaded with graphitic carbon particles.

The present disclosure further provides a preparation method of the graphitic carbon-doped and mixed crystal-type titanium dioxide nanotube composite for electrocatalysis, including the following steps:
  using the titanium substrate as an anode and a platinum sheet as a cathode in an electrolyte for anodic oxidation to obtain a titanium dioxide nanotube array/titanium substrate composite;
  annealing the titanium dioxide nanotube array/titanium substrate composite to obtain a mixed crystal-type titanium dioxide nanotube/titanium substrate composite; and
  impregnating the mixed crystal-type titanium dioxide nanotube/titanium substrate composite in an organic carbon source solution for a hydrothermal reaction to obtain the graphitic carbon-doped and mixed crystal-type titanium dioxide nanotube composite for electrocatalysis.

Preferably, the electrolyte may be an ammonium fluoride-containing ethylene glycol aqueous solution including 0.5 wt % to 0.6 wt % of the ammonium fluoride and 5 vol % to 5.5 vol % of water.

Preferably, the anodic oxidation may be conducted at 40 V to 80 V and 20° C. to 40° C. for 100 min to 140 min with an electrode spacing of 5 cm to 10 cm.

Preferably, the annealing may be conducted at an annealing temperature of 450° C. to 650° C. for 2 h with a heating rate of 5° C./min to 15° C./min from a room temperature to the annealing temperature.

Preferably, a solute in the organic carbon source solution may include one or more of glucose, soybean oil, tryptophan, and sucrose.

Preferably, the organic carbon source solution may have a mass concentration of 0.25 g/mL to 0.35 g/mL.

Preferably, the hydrothermal reaction may be conducted at 160° C. to 180° C. for 10 h to 13 h.

The present disclosure further provides use of the graphitic carbon-doped and mixed crystal-type titanium dioxide nanotube composite for electrocatalysis or a graphitic carbon-doped and mixed crystal-type titanium dioxide nanotube composite for electrocatalysis prepared by the preparation method in degradation of an organic pollutant by electrocatalysis.

Preferably, the use may include the following steps:
  placing the graphitic carbon-doped and mixed crystal-type titanium dioxide nanotube composite for electrocatalysis as an anode and a platinum electrode as a cathode in an aqueous solution of the organic pollutant, and conducting electrification for the degradation by electrocatalysis.

The present disclosure provides a graphitic carbon-doped and mixed crystal-type titanium dioxide nanotube composite for electrocatalysis, including a titanium substrate and a titanium dioxide nanomesh deposited on the titanium substrate, where the titanium dioxide nanomesh is woven from titanium dioxide nanowires; the titanium dioxide nanowires include anatase-type titanium dioxide nanowires and rutile-type titanium dioxide nanowires, and are loaded with graphitic carbon particles. The titanium dioxide nanowires include the anatase-type titanium dioxide nanowires and the rutile-type titanium dioxide nanowires; the mixed crystal-type titanium dioxide phase enhances a catalytic activity of the composite for electrocatalysis. In addition, the loaded graphitic carbon particles enhance an overall electrical conductivity of the composite for electrocatalysis, resulting in a high electron mobility of the composite for electrocatalysis, to achieve an enhanced electrocatalytic activity of the composite for electrocatalysis.

The present disclosure further provides a preparation method of the graphitic carbon-doped and mixed crystal-type titanium dioxide nanotube composite for electrocatalysis, including the following steps: using the titanium substrate as an anode and a platinum sheet as a cathode in an electrolyte for anodic oxidation to obtain a titanium dioxide nanotube array/titanium substrate composite; annealing the titanium dioxide nanotube array/titanium substrate composite to obtain a mixed crystal-type titanium dioxide nanotube/titanium substrate composite; and impregnating the mixed crystal-type titanium dioxide nanotube/titanium substrate composite in an organic carbon source solution for a hydrothermal reaction to obtain the graphitic carbon-doped and mixed crystal-type titanium dioxide nanotube composite for electrocatalysis. In the present disclosure, an amorphous titanium dioxide nanowire array is formed on the titanium substrate by the anodic oxidation. Due to an excellent specific surface area, the nanowire array enhances a catalytic activity of the composite for electrocatalysis; moreover, the titanium dioxide nanowire array formed by the anodic oxidation is not easy to fall off, thereby improving a catalytic stability of the composite for electrocatalysis. The amorphous titanium dioxide nanowire array is recrystallized by annealing to form the anatase-type titanium dioxide nanowires and the rutile-type titanium dioxide nanowires; the mixed crystal-type titanium dioxide phase enhances a catalytic activity of the composite for electrocatalysis. The mixed crystal-type titanium dioxide nanotube/titanium substrate composite is subjected to impregnation and hydrothermal reaction with the organic carbon source solution, and graphitic carbon particles are loaded on the formed titanium dioxide nanowires. The loaded graphitic carbon particles enhance an overall electrical conductivity of the composite for electrocatalysis, resulting in a high electron mobility of the composite for electrocatalysis, to achieve an enhanced electrocatalytic activity of the composite for electrocatalysis.

The present disclosure further provides use of the graphitic carbon-doped and mixed crystal-type titanium dioxide nanotube composite for electrocatalysis or a graphitic carbon-doped and mixed crystal-type titanium dioxide nanotube composite for electrocatalysis prepared by the preparation method in degradation of an organic pollutant by electrocatalysis. Due to an excellent electrocatalytic activity, the composite for electrocatalysis can be better applied to degradation of organic pollutants by electrocatalysis.

DETAILED DESCRIPTION OF THE EMBODIMENTS

The present disclosure provides a graphitic carbon-doped and mixed crystal-type titanium dioxide nanotube composite for electrocatalysis, including a titanium substrate and a titanium dioxide nanomesh deposited on the titanium substrate, where the titanium dioxide nanomesh is woven from titanium dioxide nanowires; the titanium dioxide nanowires include anatase-type titanium dioxide nanowires and rutile-type titanium dioxide nanowires, and are loaded with graphitic carbon particles.

The graphitic carbon-doped and mixed crystal-type titanium dioxide nanotube composite for electrocatalysis includes the titanium substrate. The titanium substrate includes preferably a titanium mesh with a mesh number of preferably 200 mesh to 300 mesh.

The graphitic carbon-doped and mixed crystal-type titanium dioxide nanotube composite for electrocatalysis further includes a titanium dioxide nanomesh deposited on the titanium substrate, where the titanium dioxide nanomesh is woven from titanium dioxide nanowires; the titanium dioxide nanowires include anatase-type titanium dioxide nanowires and rutile-type titanium dioxide nanowires are loaded with graphitic carbon particles. A mass of the graphitic carbon particles is preferably 5% to 20%, more preferably 10% to 15% of a mass of the titanium dioxide nanowires.

The present disclosure further provides a preparation method of the graphitic carbon-doped and mixed crystal-type titanium dioxide nanotube composite for electrocatalysis, including the following steps:

using the titanium substrate as an anode and a platinum sheet as a cathode in an electrolyte for anodic oxidation to obtain a titanium dioxide nanotube array/titanium substrate composite;

annealing the titanium dioxide nanotube array/titanium substrate composite to obtain a mixed crystal-type titanium dioxide nanotube/titanium substrate composite; and impregnating the mixed crystal-type titanium dioxide nanotube/titanium substrate composite in an organic carbon source solution for a hydrothermal reaction to obtain the graphitic carbon-doped and mixed crystal-type titanium dioxide nanotube composite for electrocatalysis.

In the present disclosure, the raw materials provided herein are all preferably commercially-available products unless otherwise specified.

The titanium substrate as the anode and the platinum sheet as the cathode are placed in the electrolyte for anodic oxidation to obtain the titanium dioxide nanotube array/titanium substrate composite.

In the present disclosure, the titanium substrate includes preferably a titanium mesh with a mesh number of preferably 200 mesh. The titanium substrate before use is preferably subjected to pretreatment, including preferably ultrasonic treatment and mixed acid treatment in sequence. The ultrasonic treatment includes preferably conducting propanol ultrasonic, methanol ultrasonic and isopropanol ultrasonic treatments in sequence, each being conducted for preferably 10 min. After the ultrasonic treatment, an obtained titanium substrate is preferably subjected to ultrasonic water washing and drying; where the ultrasonic water washing is conducted for preferably 5 min; and the drying is conducted by preferably blow-drying. A reagent for the mixed acid treatment is preferably a mixed acid including hydrofluoric acid and glacial acetic acid at a volume ratio of preferably 1:8. The mixed acid treatment is conducted preferably under ultrasonic conditions for preferably 1 min to 3 min, more preferably 2 min. The mixed acid treatment can remove an oxide film on the titanium substrate. After the mixed acid treatment, an obtained titanium substrate is preferably subjected to water washing, ethanol washing and drying in sequence; where the water washing and the ethanol washing each are conducted for preferably 2 min to 5 min; and the drying is conducted by preferably blow-drying.

In the present disclosure, the titanium substrate and the platinum sheet each have a purity of preferably greater than or equal to 98%.

In the present disclosure, the electrolyte is preferably an ethylene glycol aqueous solution containing ammonium fluoride. The electrolyte has preferably 0.5 wt % to 0.6 wt %, more preferably 0.52 wt % to 0.58 wt %, and most preferably 0.54 wt % to 0.56 wt % of the ammonium fluoride. The electrolyte has preferably 5 vol % to 5.5 vol %, more preferably 5.1 vol % to 5.4 vol %, and most preferably 5.2 vol % to 5.3 vol % of water. The fluoride ions in electrolyte affect a chemical etching rate of anodic oxidation, thereby affecting a microscopic morphology (such as tube diameter, tube length, and arrangement order) of the titanium dioxide nanotube. The ammonium fluoride-containing electrolyte with a solute content of 0.5 wt % to 0.6 wt % can obtain a better anodic oxidation effect, thereby improving a catalytic activity of an obtained photocatalytic composite.

In the present disclosure, the anodic oxidation is conducted at 40 V to 80 V, more preferably 50 V to 70 V, and most preferably 60 V and 20° C. to 40° C., more preferably 25° C. to 35° C., and most preferably 25° C. to 30° C. for 100 min to 140 min, more preferably 110 min to 130 min, and most preferably 120 min with an electrode spacing of 5 cm to 10 cm, more preferably 6 cm to 9 cm, and most preferably 7 cm to 8 cm.

In the present disclosure, the anodic oxidation is conducted preferably by stirring.

In the present disclosure, after the anodic oxidation, an obtained anode is preferably subjected to ethanol washing and drying in sequence to obtain the titanium dioxide nanotube array/titanium substrate composite.

In the present disclosure, amorphous titanium dioxide nanowires are deposited on the titanium substrate during the anodic oxidation, and then woven to form an amorphous titanium dioxide nanomesh; as the amorphous titanium dioxide nanomesh is obtained by deposition through anodic oxidation, the titanium dioxide phase is not easy to fall off, improving a catalytic performance of the composite for electrocatalysis.

In the present disclosure, the titanium dioxide nanotube array/titanium substrate composite is annealed to obtain the mixed crystal-type titanium dioxide nanotube/titanium substrate composite.

The annealing is conducted at an annealing temperature of preferably 450° C. to 650° C., more preferably 530° C. to 650° C. for preferably 2 h with a heating rate of 5° C./min to 15° C./min, more preferably 8° C./min to 12° C./min from a room temperature to the annealing temperature. The annealing is preferably conducted in an air atmosphere. The annealing is preferably conducted in a muffle furnace.

In the present disclosure, after the annealing, the composite is preferably cooled down to room temperature with the furnace.

In the present disclosure, the amorphous titanium dioxide nanowires are recrystallized during the annealing to form a mixture of the rutile-type titanium dioxide nanowires and the anatase-type titanium dioxide nanowires. The mixed crystal-type titanium dioxide phase enhances a catalytic performance of the composite for electrocatalysis.

In the present disclosure, the mixed crystal-type titanium dioxide nanotube/titanium substrate composite is impregnated in the organic carbon source solution for the hydrothermal reaction to obtain the graphitic carbon-doped and mixed crystal-type titanium dioxide nanotube composite for electrocatalysis.

In the present disclosure, a solute in the organic carbon source solution includes preferably one or more of glucose, soybean oil, tryptophan, and sucrose, more preferably the glucose. The organic carbon source solution has a mass concentration of preferably 0.25 g/mL to 0.35 g/mL, more preferably 0.30 g/mL. A solvent in the organic carbon source solution is preferably deionized water and/or ethanol.

In the present disclosure, the hydrothermal reaction is conducted at preferably 160° C. to 180° C., more preferably 165° C. to 175° C., and most preferably 170° C. for preferably 10 h to 13 h, more preferably 11 h to 12 h.

In the present disclosure, an obtained hydrothermal reaction product is preferably subjected to washing and drying. There is no special limitation on parameters of the washing and drying, as long as the hydrothermal reaction product can be fully washed and dried.

In the present disclosure, after the mixed crystal-type titanium dioxide nanotube/titanium substrate composite is subjected to the impregnation and hydrothermal reaction in the organic carbon solution, organic carbon in the organic carbon solution forms the graphitic carbon and is loaded on the titanium dioxide nanowires. This increases a conductivity of the composite for electrocatalysis, thereby further increasing an electrocatalytic activity of the composite for electrocatalysis.

The disclosure further provides use of the graphitic carbon-doped and mixed crystal-type titanium dioxide nanotube composite for electrocatalysis or a graphitic carbon-doped and mixed crystal-type titanium dioxide nanotube composite for electrocatalysis prepared by the preparation method in degradation of an organic pollutant by electrocatalysis.

In the present disclosure, the organic pollutants include preferably one or more of methyl blue, methyl blue, and methyl orange.

In the present disclosure, the use preferably includes the following steps:

placing the graphitic carbon-doped and mixed crystal-type titanium dioxide nanotube composite for electrocatalysis as an anode and a platinum electrode as a cathode in an aqueous solution of the organic pollutant, and conducting electrification for the degradation by electrocatalysis.

In the present disclosure, the anode and the cathode have a distance of preferably 5 cm to 10 cm. The degradation by electrocatalysis is conducted at preferably 40 V to 80V.

In the present disclosure, the aqueous solution of the organic pollutant has a salinity of preferably 1,000 mg/L.

The following describes in detail the graphitic carbon-doped and mixed crystal-type titanium dioxide nanotube composite for electrocatalysis, and the preparation method and the use thereof provided by the present disclosure with reference to the examples which, however, are not to be construed as limiting the scope of protection of the present disclosure.

Example 1

A preparation method of a graphitic carbon-doped and mixed crystal-type titanium dioxide nanomesh composite for electrocatalysis included the following steps:

(1) Pretreatment of titanium mesh (with a purity of 98%, 200 mesh): a pure titanium mesh was placed in beakers containing propanol, methanol, and isopropanol in sequence, and ultrasonically cleaned in an ultrasonic cleaner for 10 min, after taking out, the titanium mesh was further ultrasonically cleaned with deionized water for 5 min, and blow-dried for later use; the titanium mesh was ultrasonically cleaned for 2 min using a mixed acid (HF: glacial acetic acid=1:8), to remove an external oxide film; and the titanium mesh was washed with the deionized water and ethanol each for 3 min in sequence, dried and sealed.

(2) A Pt sheet (purity 98%) was used as a cathode, and the titanium mesh with a smooth surface pretreated in step (1) was used as an anode, where a distance between the two electrodes was 7 cm, and anodic oxidation was conducted in an electrolyte containing an ethylene glycol solution including 0.5 wt % $NH_4F$ and 3 vol % $H_2O$; the whole anodic oxidation was conducted by constant-temperature magnetic stirring, at 25° C. and 60 V for 120 min; the anode was transferred in an ethanol solution, and dried to obtain a titanium dioxide nanotube array/titanium substrate composite.

(3) The titanium dioxide nanotube array/titanium substrate composite was placed in a muffle furnace, heated to 550° C. at 10° C./min in an air atmosphere, kept for 2 h, and cooled with the furnace to obtain a mixed crystal-type titanium dioxide nanotube/titanium substrate composite.

(4) A glucose powder was weighed and completely dissolved in deionized water to obtain a glucose solution with a glucose concentration of 0.3 g/mL, and the glucose solution was transferred into a hydrothermal reaction kettle; the mixed crystal-type titanium dioxide nanotube/titanium substrate composite obtained in step (3) was immersed into the glucose solution, and the hydrothermal reaction kettle was heated in a blast drying oven at 170° C. for 12 h; the composite was taken out, cleaned, and dried to obtain a composite for electrocatalysis, namely the graphitic carbon-doped and mixed crystal-type titanium dioxide nanotube composite for electrocatalysis (C—$TiO_2$); where a mass of graphitic carbon particles was 5% of a mass of the titanium dioxide nanowires.

Figure 1:
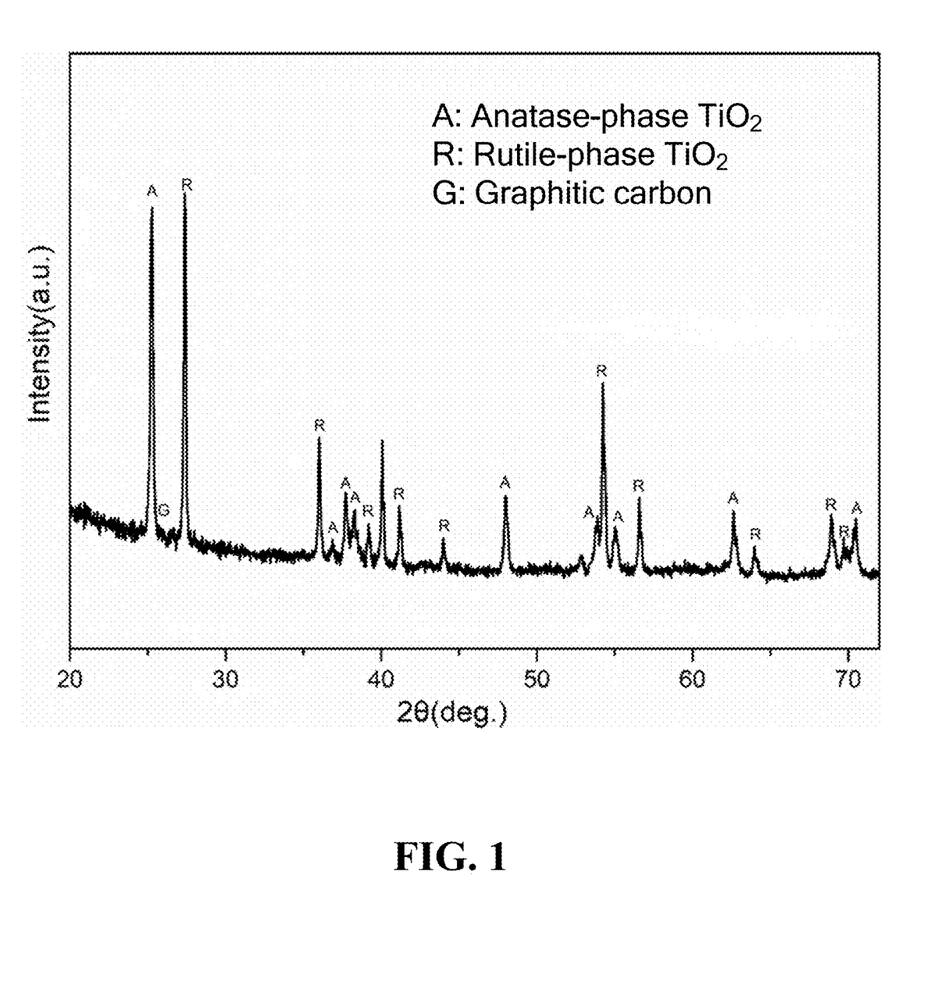
FIG. 1 shows an X-ray diffraction (XRD) spectrum of a graphitic carbon-doped and mixed crystal-type titanium dioxide nanotube composite for electrocatalysis obtained in Example 1.

FIG. 1 shows an XRD spectrum of the graphitic carbon-doped and mixed crystal-type titanium dioxide nanotube composite for electrocatalysis. It can be seen from FIG. 1 that by comparing with a spectrum standard card of a rutile phase and an anatase phase, it can be known that the graphitic carbon-doped and mixed crystal-type titanium dioxide nanotube composite for electrocatalysis is composed of the rutile phase and the anatase phase; and graphitic carbon XRD diffraction peaks can also be clearly seen.

Figure 2:
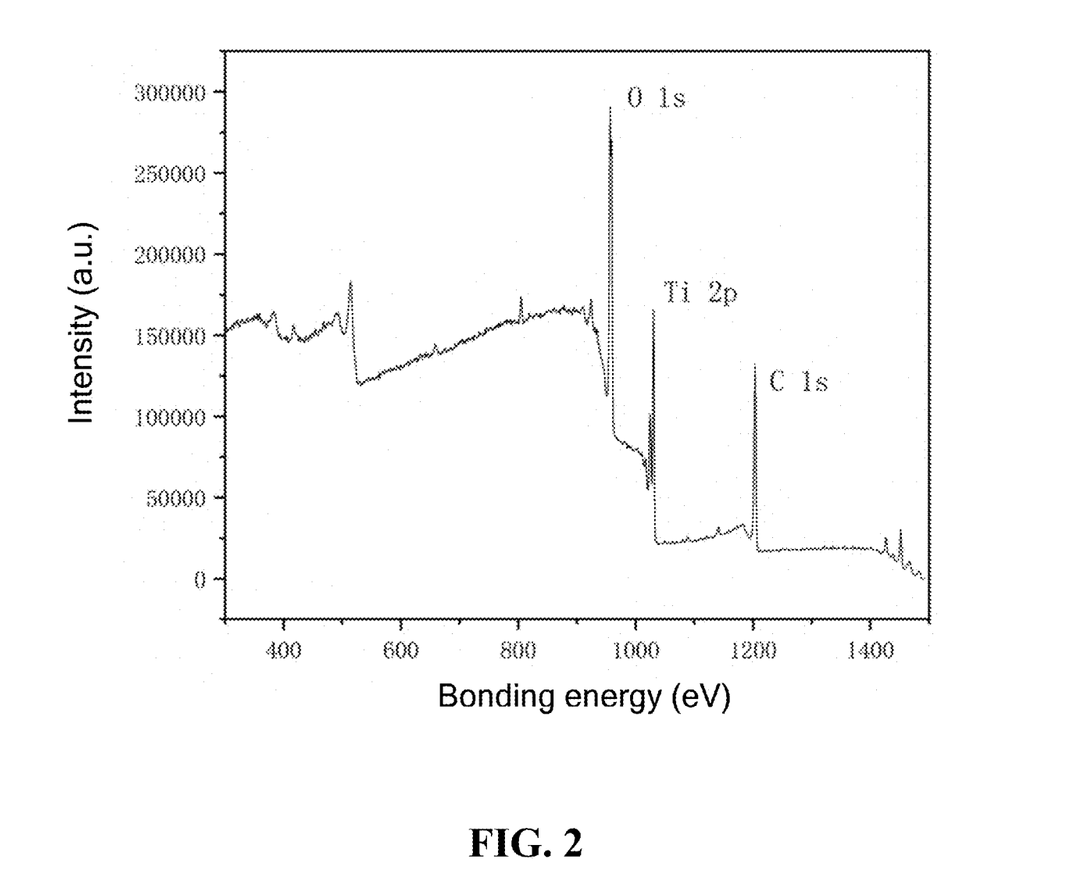
FIG. 2 shows an X-ray photoelectron spectroscopy (XPS) scanning image of the graphitic carbon-doped and mixed crystal-type titanium dioxide nanotube composite for electrocatalysis obtained in Example 1.

FIG. 2 shows an XPS scanning image of the graphitic carbon-doped and mixed crystal-type titanium dioxide nanotube composite for electrocatalysis. It can be seen from FIG. 2 that a surface of the graphitic carbon-doped and mixed crystal-type titanium dioxide nanotube composite for electrocatalysis mainly includes three elements Ti, O and C, and a C is peak exists with a peak height significantly higher than a carbon peak of a test pollutant. This confirms the existence of C in the sample, namely the graphitic carbon-doped and mixed crystal-type titanium dioxide nanotube composite for electrocatalysis.

Figure 3:
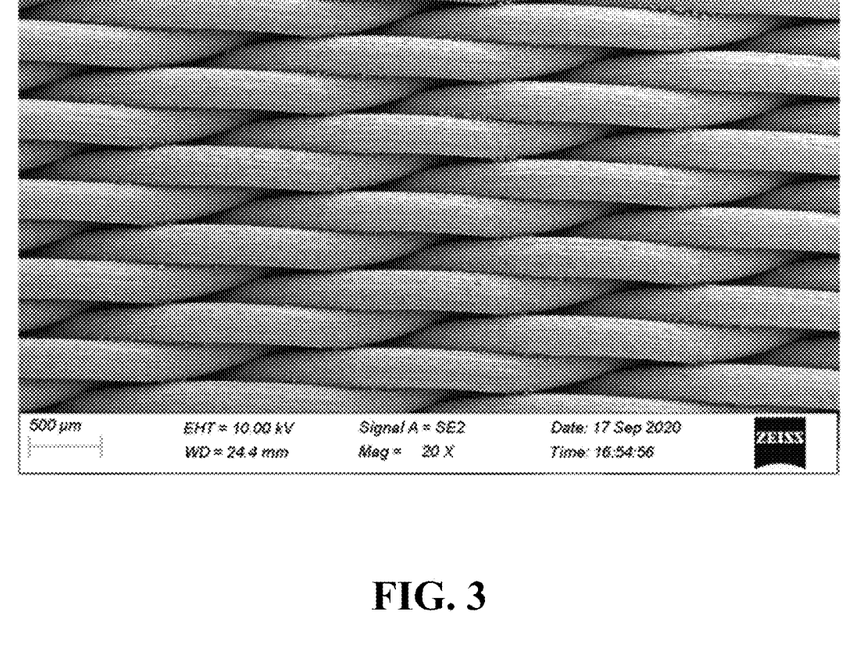
FIG. 3 and FIG. 4 show scanning electron microscope (SEM) images of the graphitic carbon-doped and mixed crystal-type titanium dioxide nanotube composite for electrocatalysis obtained in Example 1 at different magnifications.
Figure 4:
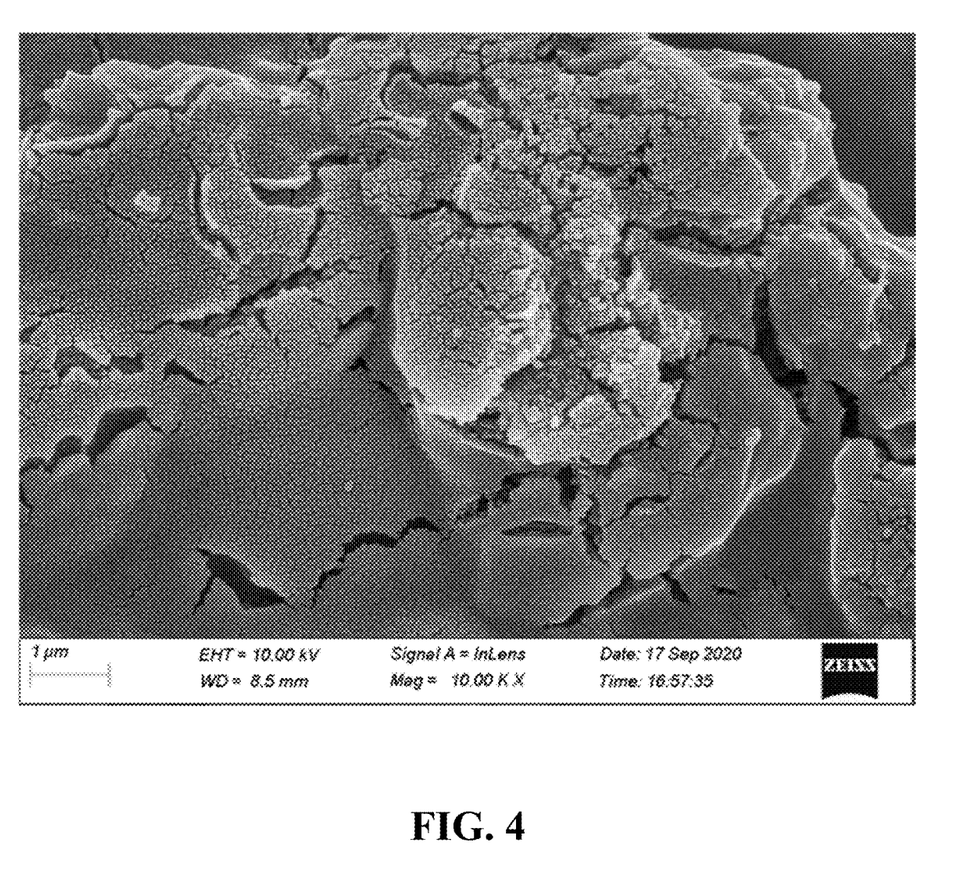

FIG. 3 and FIG. 4 show SEM images of the graphitic carbon-doped and mixed crystal-type titanium dioxide nanotube composite for electrocatalysis at different magnifications. It can be seen from FIG. 3 and FIG. 4 that the titanium dioxide nanowires are woven into a nanomesh structure, and the titanium dioxide nanowires are loaded with graphitic carbon nanoparticles.

Figure 5:
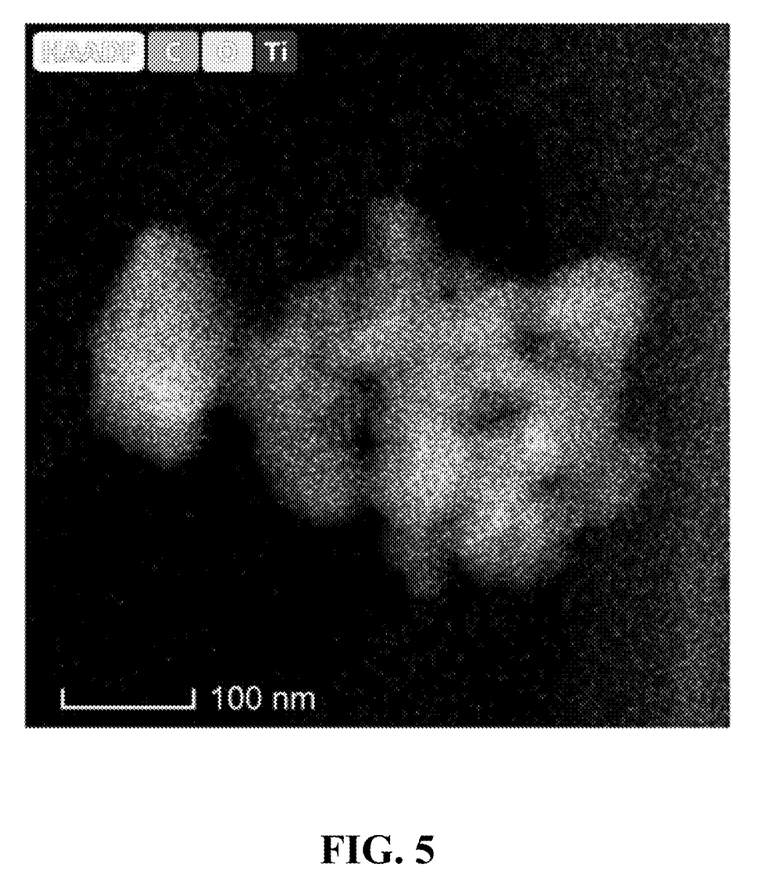
FIG. 5 shows an energy dispersive spectroscopy (EDS) layered image of the graphitic carbon-doped and mixed crystal-type titanium dioxide nanotube composite for electrocatalysis obtained in Example 1.
Figure 6:
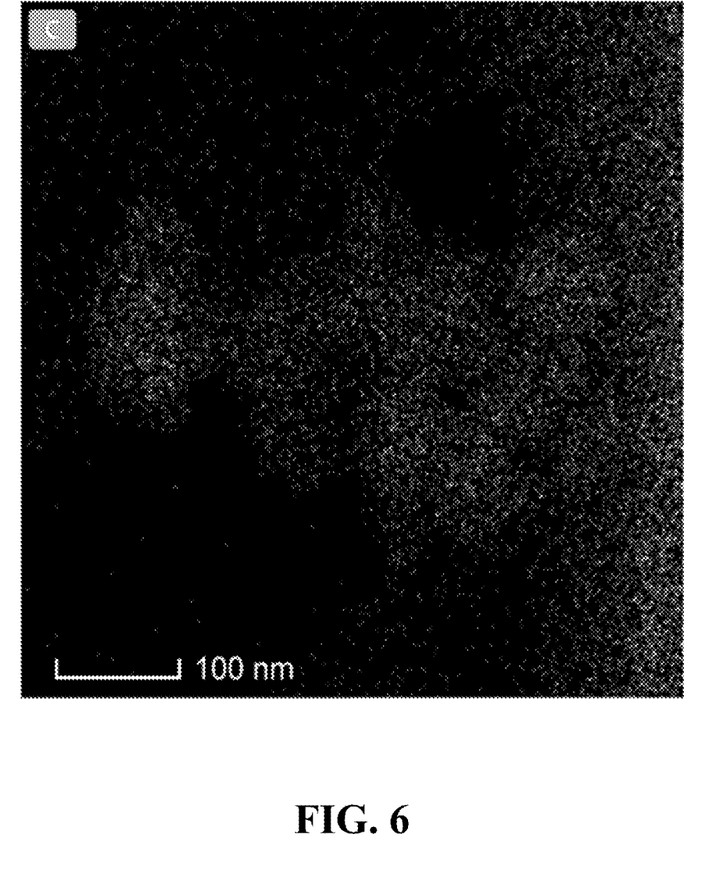
FIG. 6 shows a mapping diagram of C element distribution.
Figure 7:
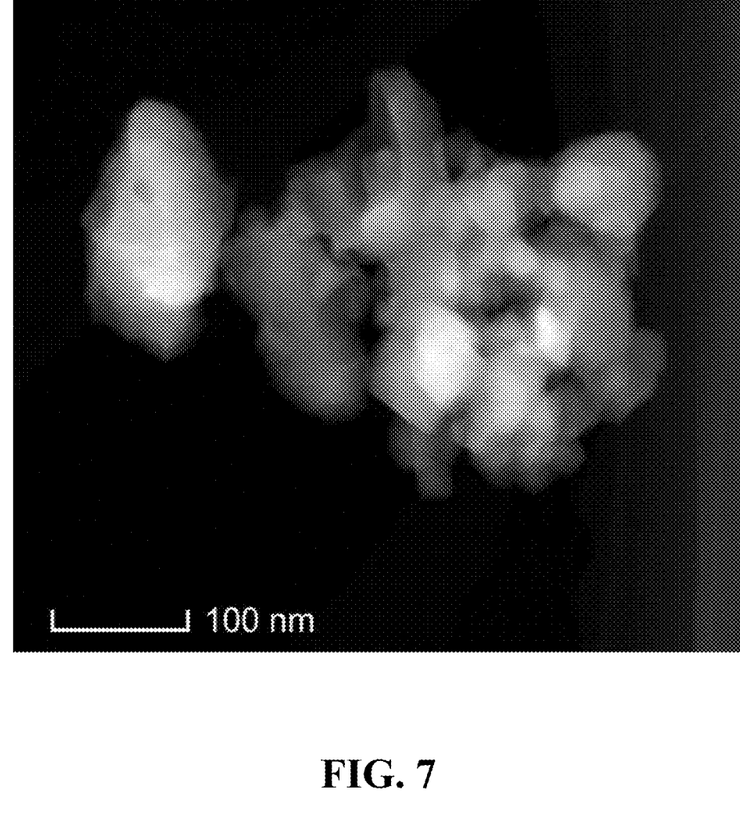
FIG. 7 shows a transmission electron microscope (TEM) image of the graphitic carbon-doped and mixed crystal-type titanium dioxide nanotube composite for electrocatalysis obtained in Example 1.

FIG. 5 shows an EDS layered image of the graphitic carbon-doped and mixed crystal-type titanium dioxide nanotube composite for electrocatalysis; FIG. 6 shows a mapping diagram of C element distribution; and FIG. 7 shows a TEM image of the graphitic carbon-doped and mixed crystal-type titanium dioxide nanotube composite for electrocatalysis. It can be seen from FIG. 5 to FIG. 7 that the surface of the sample mainly includes three elements Ti, O and C, with an extremely uniform distribution, indicating that the sample has C, namely the graphitic carbon-doped and mixed crystal-type titanium dioxide nanotube composite for electrocatalysis.

Comparative Example 1

Only steps (1) to (3) of Example 1 were repeated to prepare a pure $TiO_2$ nanotube mesh array (referred to as $TiO_2$).

Use of an obtained catalytic material in degradation of an organic dye methyl blue by electrocatalysis specifically included the following steps:

50 mL of a methyl blue solution with a concentration of 12 mg/L was used as an electrolyte, the catalytic materials in Example 1 and Comparative Example 1 were used as an anode separately, and a platinum electrode was used as a cathode; electrocatalysis was conducted with an electrode spacing of 1.1 cm, at a current of 0.3 A and a solution salinity of 6,000 mg/L; at room temperature, a supernatant was collected every 30 min to measure an absorbance using a UV-Vis spectrophotometer, a concentration was calculated according to an F factor, and a degradation rate curve was drawn. The results are shown in FIG. 8, corresponding to the $TiO_2$.

Example 2 Repeated Experiment

The C—$TiO_2$ in Example 1 was taken out after 150 min of electrocatalytic test, placed in deionized water for 5 min, and dried to obtain C—$TiO_2$—B for a secondary electrocatalytic test: 50 mL of a methyl blue solution with a concentration of 12 mg/L was used as an electrolyte, the C—$TiO_2$—B was used as an anode, and a platinum electrode was used as a cathode; electrocatalysis was conducted with an electrode spacing of 1.1 cm, at a solution salinity of 6,000 mg/L; at room temperature, a supernatant was collected every 30 min to measure an absorbance using a UV-Vis spectrophotometer, a concentration was calculated according to an F factor, and a degradation rate curve was drawn. The results are shown in FIG. 8, corresponding to the C—$TiO_2$—B.

Figure 8:
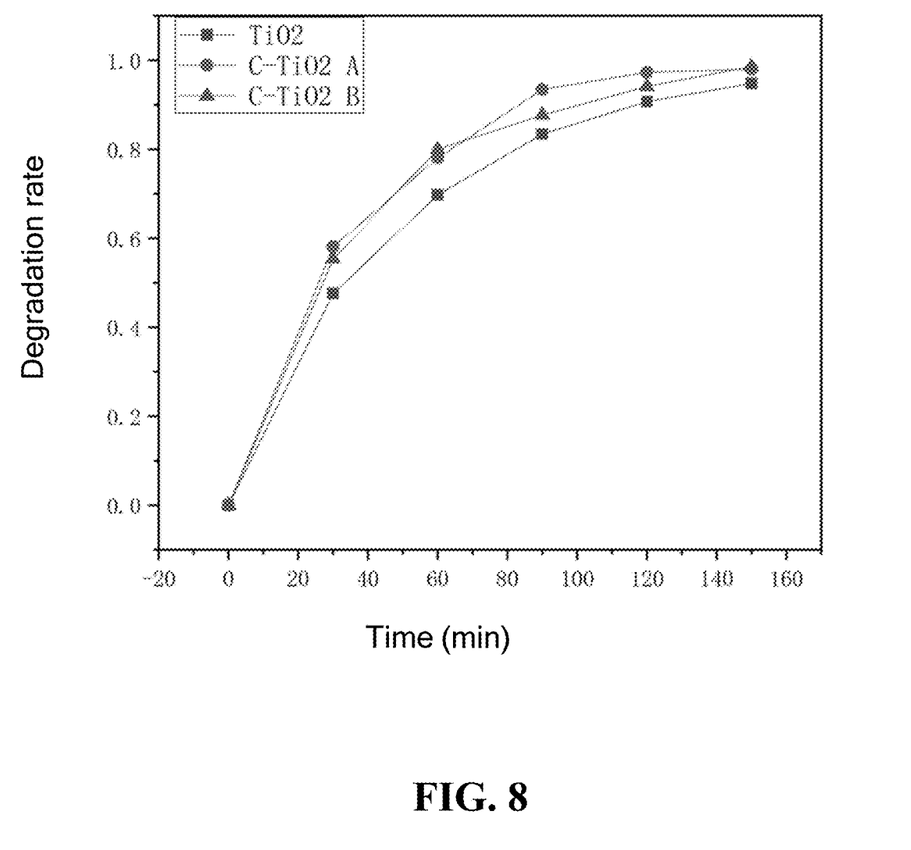
FIG. 8 shows a test curve comparison of electrocatalysis performances of C—$TiO_2$ obtained in Example 1, $TiO_2$ obtained in Comparative Example 1 and C—$TiO_2$—B obtained in Example 2.

It can be seen from FIG. 8 that a degradation rate of methyl blue by electrocatalysis is 98.02%, showing that the C—$TiO_2$ has a significantly higher electrocatalytic effect than the pure $TiO_2$ nanotube network array; compared with the primary electrocatalytic test, the degradation rate of methyl blue solution does not decrease at 150 min, indicating that the carbon-doped titanium dioxide nanotube composite for electrocatalysis has a relatively desirable reusable effect.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A graphitic carbon-doped and mixed crystal-type titanium dioxide nanotube composite for electrocatalysis, comprising a titanium substrate and a titanium dioxide nanomesh deposited on the titanium substrate, wherein the titanium dioxide nanomesh is woven from titanium dioxide nanowires; the titanium dioxide nanowires comprise anatase-type titanium dioxide nanowires and rutile-type titanium dioxide nanowires, and are loaded with graphitic carbon particles.

2. A preparation method of the graphitic carbon-doped and mixed crystal-type titanium dioxide nanotube composite for electrocatalysis according to claim 1, comprising the following steps:
  using the titanium substrate as an anode and a platinum sheet as a cathode in an electrolyte for anodic oxidation to obtain a titanium dioxide nanotube array/titanium substrate composite;
  annealing the titanium dioxide nanotube array/titanium substrate composite to obtain a mixed crystal-type titanium dioxide nanotube/titanium substrate composite; and
  impregnating the mixed crystal-type titanium dioxide nanotube/titanium substrate composite in an organic carbon source solution for a hydrothermal reaction to obtain the graphitic carbon-doped and mixed crystal-type titanium dioxide nanotube composite for electrocatalysis.

3. The preparation method according to claim 2, wherein the electrolyte is an ammonium fluoride-containing ethylene glycol aqueous solution comprising 0.5 wt % to 0.6 wt % of the ammonium fluoride and 5 vol % to 5.5 vol % of water.

4. The preparation method according to claim 3, wherein the anodic oxidation is conducted at 40 V to 80 V and 20° C. to 40° C. for 100 min to 140 min with an electrode spacing of 5 cm to 10 cm.

5. The preparation method according to claim 2, wherein the anodic oxidation is conducted at 40 V to 80 V and 20° C. to 40° C. for 100 min to 140 min with an electrode spacing of 5 cm to 10 cm.

6. The preparation method according to claim 2, wherein the annealing is conducted at an annealing temperature of 450° C. to 650° C. for 2 h with a heating rate of 5° C./min to 15° C./min from a room temperature to the annealing temperature.

7. The preparation method according to claim 2, wherein a solute in the organic carbon source solution comprises one or more of glucose, soybean oil, tryptophan, and sucrose.

8. The preparation method according to claim 7, wherein the organic carbon source solution has a mass concentration of 0.25 g/mL to 0.35 g/mL.

9. The preparation method according to claim 2, wherein the organic carbon source solution has a mass concentration of 0.25 g/mL to 0.35 g/mL.

10. The preparation method according to claim 2, wherein the hydrothermal reaction is conducted at 160° C. to 180° C. for 10 h to 13 h.

11. Use of the graphitic carbon-doped and mixed crystal-type titanium dioxide nanotube composite for electrocatalysis according to claim 1 in degradation of an organic pollutant by electrocatalysis.

12. The use according to claim 11, comprising the following steps:
  placing the graphitic carbon-doped and mixed crystal-type titanium dioxide nanotube composite for electrocatalysis as an anode and a platinum electrode as a cathode in an aqueous solution of the organic pollutant, and conducting electrification for the degradation by electrocatalysis.

* * * * *